United States Patent [19]

Flynn

[11] 4,182,051

[45] Jan. 8, 1980

[54] ENTERTAINMENT AND/OR EDUCATIONAL DEVICE

[76] Inventor: Dennis E. Flynn, Shavington, Groby Place, Altrincham, Cheshire, WA14 4AL, England

[21] Appl. No.: 833,745

[22] Filed: Sep. 16, 1977

[51] Int. Cl.² .................................................. G09B 1/24
[52] U.S. Cl. ........................................... 35/9 E; 35/76; 40/518
[58] Field of Search ................. 35/9 E, 9 F, 75, 76; 40/518

[56] References Cited

U.S. PATENT DOCUMENTS

| 669,682 | 3/1901 | Carver | 40/518 |
|---|---|---|---|
| 1,525,696 | 2/1925 | Spencer | 35/75 |
| 1,992,944 | 3/1935 | Grudin | 40/518 |
| 2,924,889 | 2/1960 | Di Lauro | 35/76 X |
| 3,392,459 | 7/1968 | Schure et al. | 35/9 F |

Primary Examiner—William H. Grieb
Attorney, Agent, or Firm—Pearson & Pearson

[57] ABSTRACT

An entertainment and/or educational device is proposed which comprises a housing having oppositely facing windows therein and a display element within the housing having related markings thereon, the individual ones of the said related markings being simultaneously visible through a respective one of the windows and the windows being provided in such disposition on the housing that the respective markings visible thereat can be viewed only from opposite sides of the housing.

2 Claims, 5 Drawing Figures

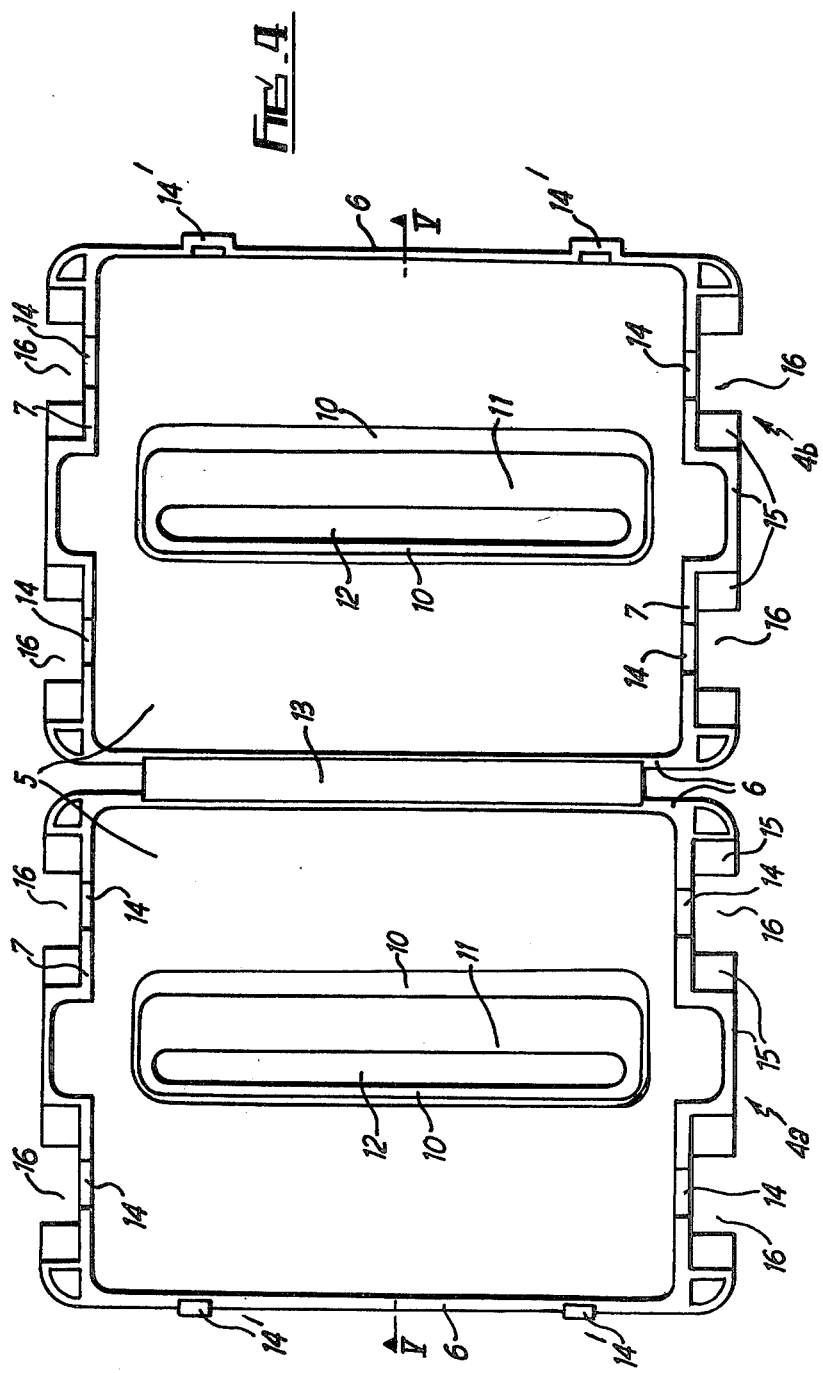
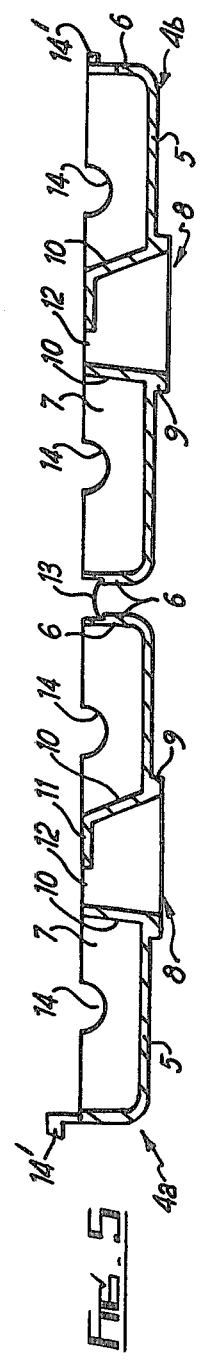

ENTERTAINMENT AND/OR EDUCATIONAL DEVICE

This invention relates to an entertainment and/or educational device.

According to the invention, there is provided an entertainment and/or educational device comprising a housing having two windows therein at oppositely directed sides thereof, and a display element having at least one pair of related markings thereon, said display element being mountable within the housing at a position whereat the markings of the one said pair are simultaneously in alignment with said windows whereby in said position said markings are displayed through said windows but can only be viewed from opposite sides of the housing.

Whilst the markings may take any pictorial and/or word and/or numerical and/or other suitable form or combination of forms, in a preferred embodiment the related markings of the or each pair constitute a question and an answer. With this preferred arrangement, in use, the display equipment is mounted in the housing so that a question is displayed at one of said windows. The user attempts to answer the question and can then find the correct answer displayed at the other window.

Preferably a plurality of pairs of related markings are provided on the display elements and the display element is movable within the housing to successive positions whereat successive pairs of markings are in alignment with the windows. Most conveniently the said display element is an elongated film or web and this may be movable within the housing by winding same from a first spool to a second spool. The related markings of the or each pair may be provided on opposite sides of the film or web.

Said windows may be apertures in the housing or transparent portions thereof.

The windows may be provided with lenses to magnify the markings on the display element.

The invention will now be described further by way of example only with reference to the accompanying drawings in which:

FIG. 4 is a plan view of the housing of the equipment in an opened out position; and FIG. 5 is a section on the line V—V of FIG. 4.

Figure 1:
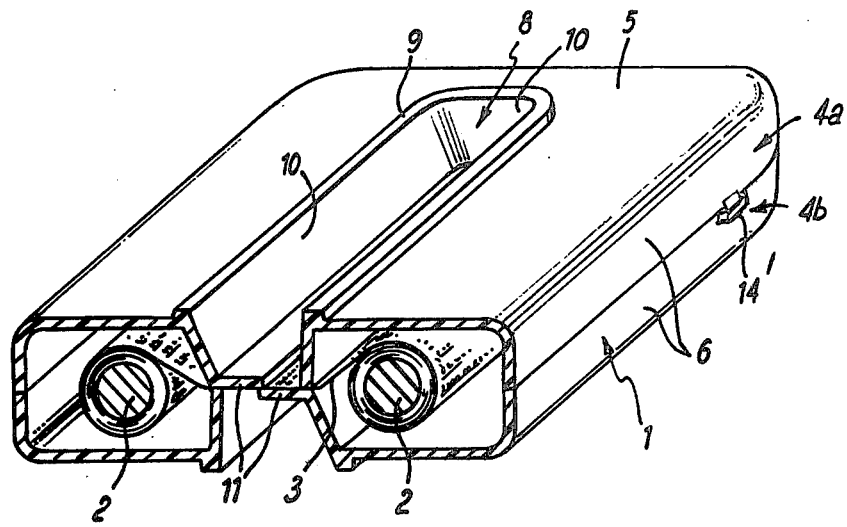
FIG. 1 is a sectional perspective view of one form of an entertainment and/or educational device according to the present invention.

The equipment comprises a housing 1, two spools 2 mountable within the housing 1, and a film or web 3 of thin flexible material which can be wound from one spool 2 to the other.

The housing 1 comprises two moulded plastics shells 4a, 4b each having a generally rectangular base 5, side walls 6, 7 (FIGS. 4 and 5) around the entire periphery of each base 5, a longitudinally extending slot 8 along the centre of each base 5, a rim 9 extending around the periphery of the slot 8 on the outer surface of each base 5 and further side walls 10 projecting from the inner surface of each base about the periphery of the slot 8 to a position level with the top of the side walls 6, 7. The side walls 10 are inclined towards each other and one long side wall 10 of each base 5 has a turned over edge portion 11 whereby there is defined a further slot 12, narrower than the slot 8, adjacent a flat surface formed by the surface of the portion 11 of the other shell when the shells are in the relative dispositions shown in FIG. 1.

The two shells, 4a, 4b, are hinged together by means of an integral thin flexible plastics strip 13 along one long edge of each shell, and the other long edges are provided with catch formations 14' whereby the shells can be held together with the side walls 6, 7, 10 of one shell in alignment with and abutting against the side walls 6, 7, 10 of the other shell so as to define an enclosure between the shells (FIG. 1). The slots 12 are arranged so that when the shells 4a, 4b, are closed together the slots 12 are not aligned but are staggered, with the slot 12 of each shell 4a, 4b aligned with the flat surface 11 of the other shell 4a, 4b.

Each short side wall 7 has spaced semi-circular cut-outs 14 therein corresponding ones of which define two pairs of aligned circular apertures when the shells 4a, 4b are closed together. As can be seen from FIG. 4, there are projecting formations 15 associated with the side walls 7 and the bases 5 in the region of the cut-outs 14 which surround the apertures apart from upper and lower gaps 16.

Figure 2:
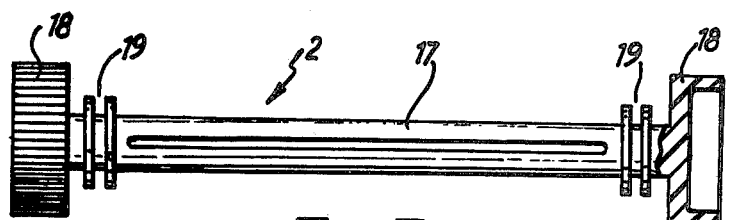
FIG. 2 is a plan view of a spool used in the device.
Figure 3:
FIG. 3 is a plan view of a window of the device.

The spools 2, as shown in FIG. 2, comprise slotted rods 17 with milled knobs 18 at the ends and flanges 19 adjacent the knobs.

In use, one spool 2 having film wound therearound is positioned in one shell 4b, with the housing open, so that the rod 17 engages opposite cut-outs 14 with the milled knobs 18 on the outer sides of the side walls 7 and the flanges 19 on the inner sides. In a similar manner the other spool 2 is engaged with the other pair of opposed cut-outs 14 in the shell 4b. The film is then drawn over the flat surface 11 and connected to the other spool. The housing can then be closed, whereupon it will be appeciated that the film 3 is held between the opposite flat surfaces 11 and opposite surfaces of the film 3 can be viewed from opposite sides of the housing through opposite windows each of which is defined by a respective combination of said slots 8 and 12.

The milled knobs 18 are positioned within the confines of the projecting portions 15 surrounding the apertures but are freely exposed at the gaps 16 and can be manually rotated. Such rotation causes the film 3 to be wound from one spool 2 to the other and the arrangement of the side walls 10 whilst ensuring accurate positioning of the film is such as to permit this movement.

It is visualised that the film will be printed with questions on one side and corresponding answers on the other side arranged so that when a question can be seen on one side of the housing, the corresponding answer can be seen on the other side. The questions may relate to any desired subject such as sport, entertainment, history, geography, general knowledge or may relate to languages, the film, for example, having words in one language (say French) on one side and translations in another language (say English) on the opposite side. The film may have questions relating to a mixture of different subjects or alternatively the questions may all relate to a common subject. Different films may be used with the same housing or alternatively the device may be supplied in the manner of a cassette in that the film is retained permanently within the housing and further different devices are used to give a range of different questions and answers.

In addition to questions and answers the film may carry other markings such as an indication of points to be scored by answering questions correctly. Penalty and bonus points can also be printed alongside the questions and/or answers.

It is of course to be understood that the invention is not intended to be restricted to the details of the above embodiment which are described by way of example only.

What I claim is:

1. An entertainment and/or educational device comprising:

a housing, said housing having therein first and second chambers and a passageway between said chambers; said passageway having opposite walls at oppositely directed sides of said housing, each said wall having a window portion and a support portion with the window portion of each said wall being in superimposed relationship with the support portion of the other said wall;

first and second spools respectively rotatably mounted in said first and second chambers;

a display element in the form of an elongated film or web having a plurality of pairs of markings thereon, the markings of each said pair being respectively a question and an answer and being respectively on opposite sides of the display element; said display element being mounted on the said first and second spools and extending between said spools along said passageway;

means externally of said housing for manual rotation of said spools to move said display element along said passageway from said first spool to said second spool to successive display positions; said walls defining guide surfaces for guiding movement of said display element therebetween;

the markings of each said pair being offset relative to each other such that the markings of successive said pairs are simultaneously in alignment with said window portions at said successive display positions, whereby in each said position said markings of one said pair are displayed through said window portions but each marking can only be viewed at a respective one of said oppositely directed sides of the housing, and that part of the said display element which is aligned with each said window portion of each said wall is supported by the support portion of the other said wall.

2. A device according to claim 1 wherein said housing is formed from a pair of like moulded plastic shells.

* * * * *